United States Patent
Sasaki et al.

(10) Patent No.: US 11,146,428 B2
(45) Date of Patent: Oct. 12, 2021

(54) ADAPTIVE EQUALIZER, OPTICAL RECEIVER, AND ADAPTIVE EQUALIZATION METHOD

(71) Applicant: FUJITSU LIMITED, Kawasaki (JP)

(72) Inventors: Daisuke Sasaki, Yokohama (JP); Hisao Nakashima, Kawasaki (JP); Nobukazu Koizumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/073,716

(22) Filed: Oct. 19, 2020

(65) Prior Publication Data

US 2021/0152403 A1 May 20, 2021

(30) Foreign Application Priority Data

Nov. 19, 2019 (JP) .............................. JP2019-208924

(51) Int. Cl.
*H03K 5/159* (2006.01)
*H04L 25/03* (2006.01)
*H04B 10/61* (2013.01)

(52) U.S. Cl.
CPC ..... *H04L 25/03178* (2013.01); *H04B 10/616* (2013.01); *H04L 25/03057* (2013.01)

(58) Field of Classification Search
CPC ..... H04L 25/03044; H04L 2025/03509; H04L 25/03178; H04L 2025/0349; H04L 27/01; H04L 25/0307; H04B 10/616

USPC ................................. 375/229–236; 398/118
See application file for complete search history.

(56) References Cited

U.S. PATENT DOCUMENTS

| | | | | |
|---|---|---|---|---|
| 6,606,129 | B1 * | 8/2003 | Limberg | H04N 5/4446 348/614 |
| 2008/0165885 | A1 * | 7/2008 | Kondoz | G10L 19/00 375/295 |
| 2008/0212727 | A1 * | 9/2008 | Jahan | H04L 25/03006 375/350 |
| 2014/0079408 | A1 | 3/2014 | Yan et al. | |

FOREIGN PATENT DOCUMENTS

JP 2014-60708 A 4/2014

* cited by examiner

*Primary Examiner* — Don N Vo
(74) *Attorney, Agent, or Firm* — Staas & Halsey LLP

(57) ABSTRACT

An adaptive equalizer, includes a sample buffer; and a processor coupled to the sample buffer and configured to: perform an adaptive equalization on data which has been fractionally sampled at a sampling rate higher than once a symbol rate and lower than twice the symbol rate, determine an initial value of a tap coefficient of the adaptive equalizer by using a training sequence inserted in the data, shift, by a predetermined shift amount, a sample point of one pattern from among two consecutive patterns included in the training sequence, specify a position of the training sequence in the data by replacing an original sample value with a sample value at the shifted sample point, and update the initial value of the tap coefficient based on the specified training sequence.

8 Claims, 22 Drawing Sheets

FIG. 6

| SAMPLING RATE | WHEN PRECEDING SAMPLE IS PHASE-SHIFTED | WHEN FOLLOWING SAMPLE IS PHASE-SHIFTED |
|---|---|---|
| 1.5 (= 3/2) TIMES | 0 SYMBOLS | 0 SYMBOLS |
| 1.33 (= 4/3) TIMES | +0.25 SYMBOLS | -0.50 SYMBOLS |
| 1.25 (= 5/4) TIMES | 0 SYMBOLS | 0 SYMBOLS |

SAMPLING WHEN T=4,f=3/2

SAMPLING WHEN T=4,f=5/4

FIG. 10

| SAMPLING RATE | WHEN PRECEDING SAMPLE IS PHASE-SHIFTED | WHEN FOLLOWING SAMPLE IS PHASE-SHIFTED |
| --- | --- | --- |
| 1.5 (= 3/2) TIMES | +1/3 SYMBOLS | -1/3 SYMBOLS |
| 1.33 (= 4/3) TIMES | +0.50 SYMBOLS | -0.25 SYMBOLS |
| 1.25 (= 5/4) TIMES | +0.2 SYMBOLS | -0.6 SYMBOLS |

CORRELATION COMPUTATION RESULT

ADAPTIVE EQUALIZER, OPTICAL RECEIVER, AND ADAPTIVE EQUALIZATION METHOD

CROSS-REFERENCE TO RELATED APPLICATION

This application is based upon and claims the benefit of priority of the prior Japanese Patent Application No. 2019-208924, filed on Nov. 19, 2019, the entire contents of which are incorporated herein by reference.

FIELD

The embodiments discussed herein are related to an adaptive equalizer, an optical receiver, and an adaptive equalization method.

BACKGROUND

In the digital coherent optical transmission technology, received light in which data is superimposed on the phase of an optical carrier wave is subjected to analog-to-digital conversion (hereinafter referred to as "A/D conversion"), waveform distortion is compensated by digital signal processing, and the transmitted data is restored from the received signal. An adaptive equalization unit of a digital signal processor (hereinafter abbreviated as "DSP") works out inverse characteristics (tap coefficient) of the transmission line and compensates for the distortion of the transmission waveform.

To avoid aliasing and recover the proper waveform, oversampling at twice the symbol rate is usually performed. In this case, the number of taps of the equalizer is doubled and the processing amount is also increased. Due to an increase in communication traffic in recent years, it is desired to cut down power consumption in optical networks, and the reduction of power consumption and circuit scale is also expected in digital signal processing.

In response to this request, fractional sampling, which is sampling performed with a fractional value greater than once the symbol rate and smaller than twice the symbol rate, is being studied. The fractional sampling, which has a smaller number of sampling times than 2x-oversampling, may lower the number of taps to downsize the equivalent circuit, and may lower power consumption.

The characteristics of the transmission line are defined by the installation conditions of the transmission line and keep fluctuating even during communication. The adaptive equalizer updates the tap coefficient in accordance with fluctuations in the transmission line characteristics during communication, and compensates input digital data for the influence of fluctuations in the transmission line. Apart from the adaptive updating of the tap coefficient during communication, the initial value of the tap coefficient is determined based on channel estimation or the like when, for example, the optical receiver is started up or restarted, and each tap of the adaptive equalizer is set with the initial value.

There has been proposed an approach of determining an equalizer initial tap coefficient closer to an optimum value, using a training sequence provided in a transmitted signal. For example, Japanese Laid-open Patent Publication No. 2014-60708 and the like are disclosed.

SUMMARY

According to an aspect of the embodiments, an adaptive equalizer, includes a sample buffer; and a processor coupled to the sample buffer and configured to: perform an adaptive equalization on data which has been fractionally sampled at a sampling rate higher than once a symbol rate and lower than twice the symbol rate, determine an initial value of a tap coefficient of the adaptive equalizer by using a training sequence inserted in the data, shift, by a predetermined shift amount, a sample point of one pattern from among two consecutive patterns included in the training sequence, specify a position of the training sequence in the data by replacing an original sample value with a sample value at the shifted sample point, and update the initial value of the tap coefficient based on the specified training sequence.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating exemplary phase shift information;

FIG. 10 is a diagram illustrating other exemplary phase shift information;

DESCRIPTION OF EMBODIMENTS

In a well-known tap coefficient initial value determination method, the waveform of the training sequence is described using a discrete signal having a sampling rate based on the Nyquist sampling theorem.

The inventors have learned that, when introducing fractional sampling, the usual approach of determining the tap coefficient initial value from the training sequence does not function properly in some cases.

In view of the above, it is desirable to provide an adaptive equalization technology that enables to set an appropriate tap coefficient initial value using a training sequence when performing fractional sampling.

Figure 1:
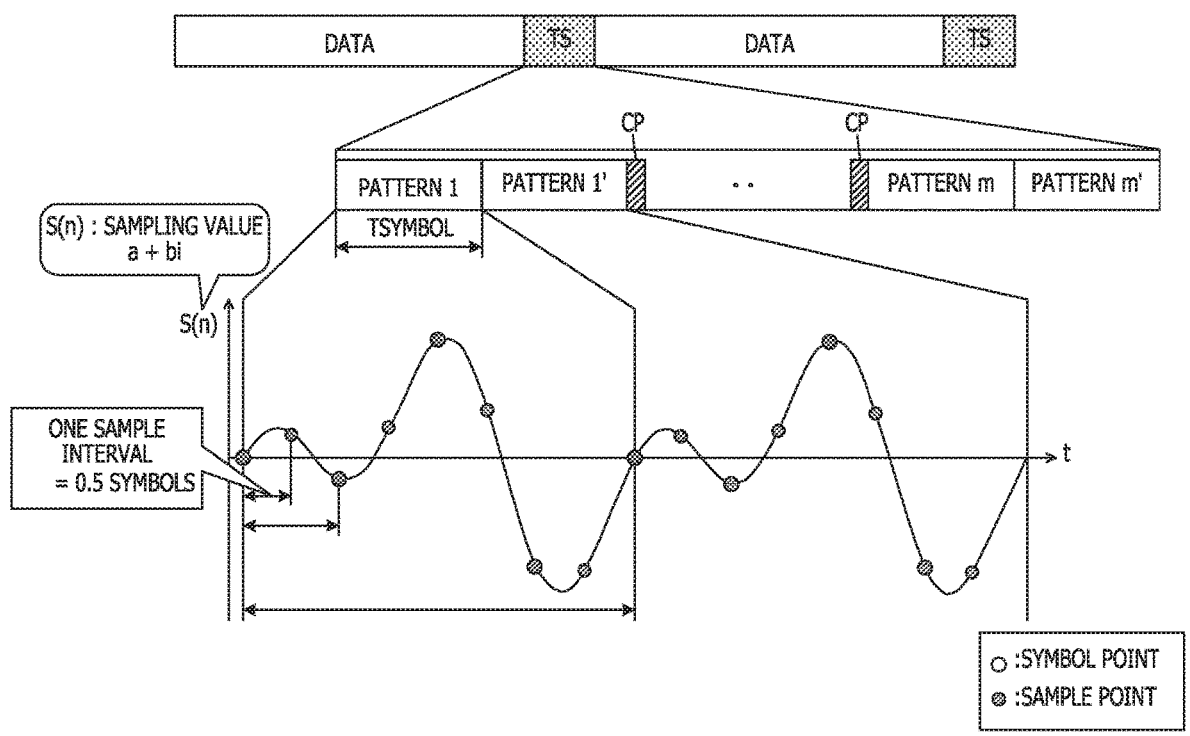
FIG. 1 is a diagram illustrating 2x-oversampling of a training sequence.

FIG. 1 illustrates a training sequence included in a received signal and the sampling of the training sequence. Here, a general 2×-oversampling is illustrated. On the transmission side, a training sequence TS is inserted between two pieces of data in advance. The data part is also called a payload. Test data may be placed in the payload when a system or an optical transceiver is started up. The training sequence TS may be padded with zeros at the beginning and end.

The training sequence TS includes m (m is a natural number) pattern pairs. One pattern pair includes two same code patterns (hereinafter simply referred to as "pattern"), and different pattern pairs have distinct patterns. For example, a pattern 1 and a pattern 1' have the same pattern, and a pattern m and a pattern m' have the same pattern, but the two pattern pairs have different patterns from each other. Adjacent pattern pairs are delimited by a cyclic prefix (CP).

The optical receiver does not know which part of sequentially digitally sampled and buffered sample values corresponds to symbols of the training sequence TS. Thus, by utilizing the fact that each pattern pair includes the same two patterns, a buffer selection position when the correlation between two consecutive patterns is maximized is defined as the start position of the training sequence TS. Once the start position of the training sequence TS is resolved, the position of the training sequence in the data is resolved because the length of the training sequence TS is already known, and the channel may be estimated. Processing of specifying the start position of the training sequence TS is called "TS synchronization".

When the symbol length of each pattern included in the training sequence TS is assumed as T and the sampling rate is assumed as f, a correlation value with respect to next (f×T) samples is calculated for every (f×T) samples. In the example in FIG. 1, T=4 and f=2 are assumed. Since the sampling rate is double, the sample interval is given as 0.5 symbols, and 2×4 samples, which are 8 samples, are obtained in each pattern. A sample value S(n) at each sample point denotes the amplitude or strength of a complex signal represented by a real part a and an imaginary part bi.

As in FIG. 1, when the value of f×T is an integer, two consecutive patterns have the same sample positions and the same number of sample points, and the TS synchronization may be achieved from the degree of correlation between the two patterns.

Figure 2:
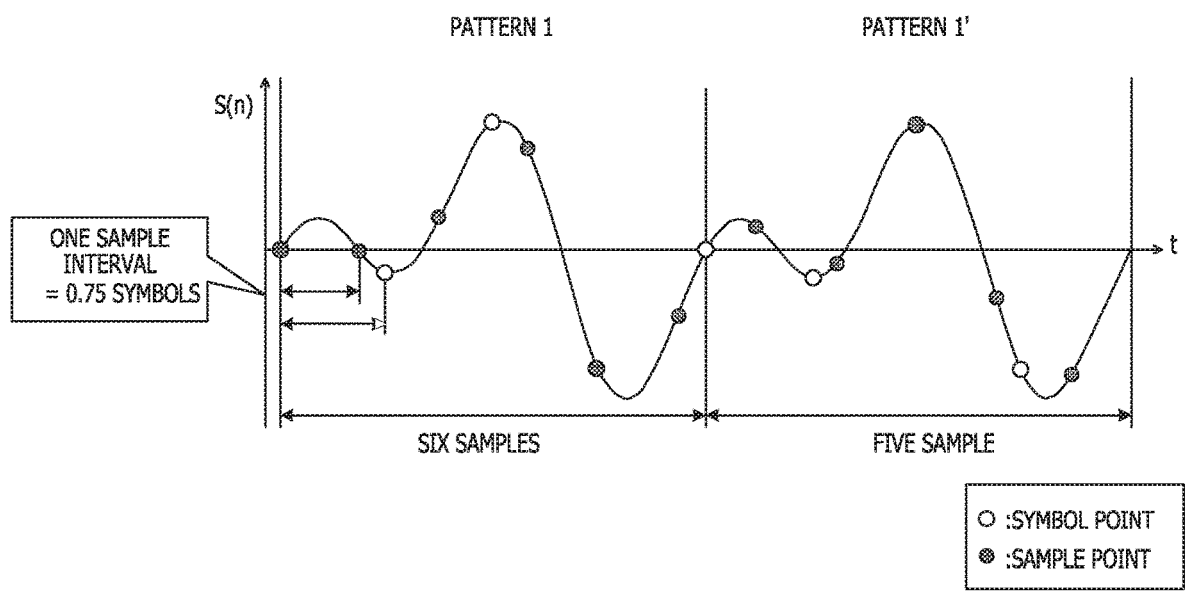
FIG. 2 is a diagram explaining a problem that occurs in fractional sampling of a training sequence.

FIG. 2 illustrates exemplary fractional sampling. The symbol length T of each pattern is T=4 as in FIG. 1, but the sampling rate f is 4/3. In this case, digital sampling is performed at a frequency of 1.33 . . . times the symbol rate, and sample data is obtained at 0.75 symbol intervals. The value of f×T is given as 16/3, which is not an integer value.

The consecutive patterns 1 and 1' have different sample points and/or different number of samples. In the pattern 1, six sample points are obtained, but in the pattern 1', five sample points are obtained at different temporal positions from the temporal positions of the pattern 1. The correlation value may not be calculated properly between the patterns 1 and 1', and an error occurs in the search of the buffer selection position by the TS synchronization.

Figure 3:
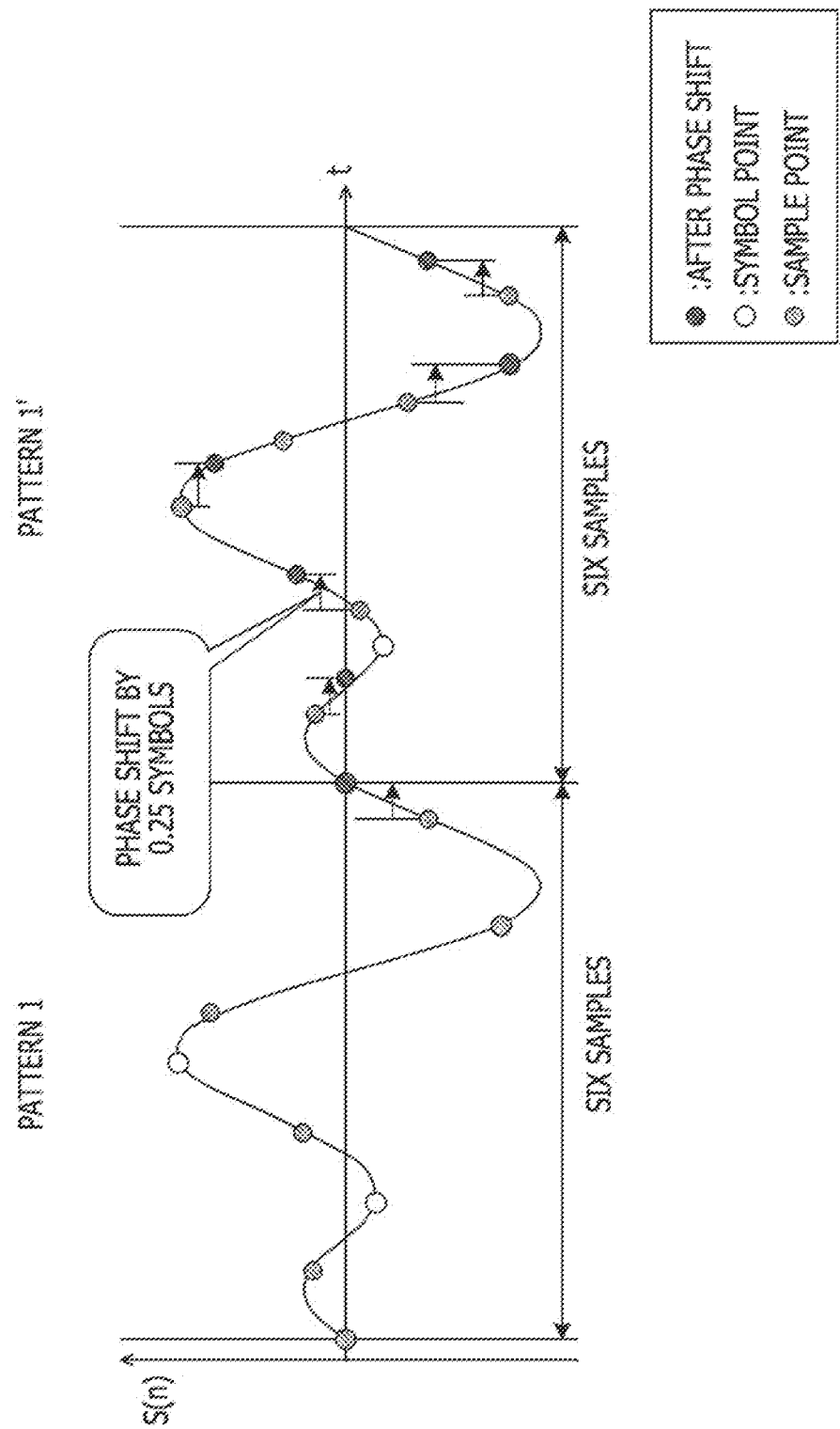
FIG. 3 is a diagram explaining a basic operation of an embodiment.

FIG. 3 illustrates an approach or configuration of an embodiment for solving the problem that occurs in FIG. 2. In the embodiment, the sample value of one of the two consecutive patterns is replaced with the sample value at a sample point phase-shifted to the same position as the sample point of the other of the patterns. Correlation computation for the TS synchronization is performed using the pattern pair in which the sample value is replaced with the sample value after the phase shift.

In FIG. 3, similarly to FIG. 2, sampling is performed at every 0.75 symbols under the conditions of T=4 and f=4/3. For example, focusing on the patterns 1 and 1', a sample value obtained when the sample point of the pattern 1' is phase-shifted to a position corresponding to the sample point of the pattern 1 is used as the sample data of the pattern 1'.

The amount of phase shift is uniquely defined by the symbol length T and the sampling rate f of each pattern forming the pattern pair. Under the conditions of T=4 and f=4/3, the amount of phase shift when the phase shift is performed in a direction in which the phase of the preceding sample is advanced, which is, for example, a plus direction, is 0.25 symbols.

The sample value S(n) at a sample position advanced by 0.25 symbols from the last sample point of the pattern 1 is assumed as first sample data of the pattern 1'. Similarly, the sample values S(n) at sample positions obtained by phase-shifting the respective five sample points of the pattern 1' by 0.25 symbols each in the plus direction are used as the sample data of the pattern 1'.

The sample value S(n) at the sample point obtained by advancing the phase by 0.25 symbols may be calculated by any method. For example, the calculation may be performed using a coefficient preset in a finite impulse response (FIR) filter of the adaptive equalizer, or the calculation may be performed by utilizing another digital signal processing function. With this approach, in the pattern 1', data containing the same number of samples may be obtained at the same sample points as the pattern 1, and the correlation value may be calculated properly. Details of the calculation of the correlation value will be described later.

The phase shift is not limited to the configuration in which the sample preceding in time is phase-shifted in the plus direction. As will be described later, the following sample may be used for substitution using a sample value when the phase shift is performed in a direction to trace back in time (minus direction). Details of this processing will also be described later. Furthermore, it is sometimes not expected to apply the phase shift to the following pattern among the two consecutive patterns, and the phase shift may be applied to the preceding pattern.

Figure 4:
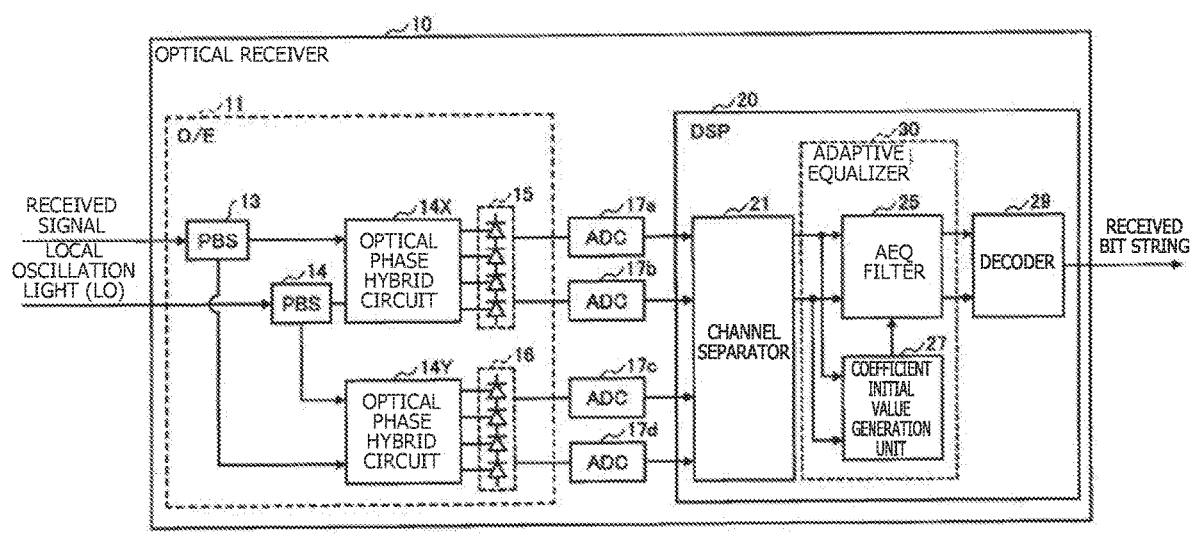
FIG. 4 is an overview diagram of an optical receiver of the embodiment.

FIG. 4 is a schematic diagram of an optical receiver 10 using an adaptive equalizer 30 of the embodiment. The optical receiver 10 is an optical receiver using a digital coherent technique. The optical receiver 10 includes an optoelectric conversion circuit (expressed as "O/E" in FIG. 4) 11 that converts an optical signal into an electrical signal, analog-to-digital converters (ADCs) 17a to 17d that convert an analog electrical signal into a digital signal, and a DSP 20.

The optoelectric conversion circuit 11 performs, for example, homodyne detection that utilizes phase and polarization diversity. The optoelectric conversion circuit 11 includes a polarization beam splitter 13 (hereinafter referred to as "PBS") 13 that separates the received optical signal into polarized waves, a PBS 14 that separates local oscillation light (LO) into polarized waves, optical phase hybrid circuits 14X and 14Y, and photodetectors 15 and 16.

The optical phase hybrid circuit 14X outputs an I component in which a received X-polarized wave and an X-polarized wave of the local oscillation light are mixed in the same phase, and a Q component in which the above X-polarized waves are mixed with a phase difference of 90°. The output of the optical phase hybrid circuit 14X is detected by two double-balanced photodiodes of the photodetector 15. The analog electrical signals of the I component and the Q component of the X-polarized waves are digitally sampled by the ADCs 17a and 17b, respectively.

Similarly, the optical phase hybrid circuit 14Y outputs an I component in which a received Y-polarized wave and a Y-polarized wave of the local oscillation light are mixed in the same phase, and a Q component in which the above Y-polarized waves are mixed with a phase difference of 90°. The output of the optical phase hybrid circuit 14Y is detected by two double-balanced photodiodes of the photodetector 16. The analog electrical signals of the I component and the Q component of the Y-polarized waves are digitally sampled by the ADCs 17c and 17d, respectively.

The ADCs 17a to 17d input, to the DSP 20, data that has been fractionally sampled at a sampling rate higher than once the symbol rate and lower than twice the symbol rate.

The DSP 20 includes a channel separator 21, the adaptive equalizer 30, and a decoder 29. The channel separator 21 separates digital signals input from the ADCs 17a to 17b into an X channel and a Y channel, and supplies the separated digital signals to the adaptive equalizer 30. In reality, the Y-polarized wave component is also contained in the X-channel signal, and the X-polarized wave component is also contained in the Y-channel signal. This is because the received optical signal input to the optoelectric conversion circuit 11 is imparted with polarization rotation, a difference in loss between polarized waves, a difference in delay between polarized waves, and the like, which are the characteristics of the transmission line.

The X-channel signal and the Y-channel signal are subjected to adaptive equalization processing in the adaptive equalizer 30, and the influence of polarization dispersion is compensated. The adaptive equalizer 30 includes an adaptive equalization (AEQ) filter 25 and a coefficient initial value generation unit 27.

The AEQ filter 25 multiplies each separated polarized wave (channel) by a tap coefficient that has inverse characteristics of the transmission line, in accordance with fluctuations in the characteristics of the transmission line during communication, and compensates for distortion due to polarization dispersion.

The coefficient initial value generation unit 27 determines a coefficient initial value set for each tap of the AEQ filter 25 prior to adaptive distortion compensation during communication. In order to set an appropriate coefficient initial value in the AEQ filter 25, the start position of the training sequence TS in the digitally sampled received data is properly specified, and the characteristics of the transmission line are estimated from the training sequence TS. In the embodiment, even when the fractional sampling is adopted, the sample data of one of the two consecutive patterns is replaced with the sample value after the phase shift, whereby the TS synchronization is appropriately performed and the position of the training sequence in the data is specified.

The signal of each channel subjected to the adaptive equalization is decoded by the decoder 29, and a received bit string is output from the DSP 20.

Figure 5:
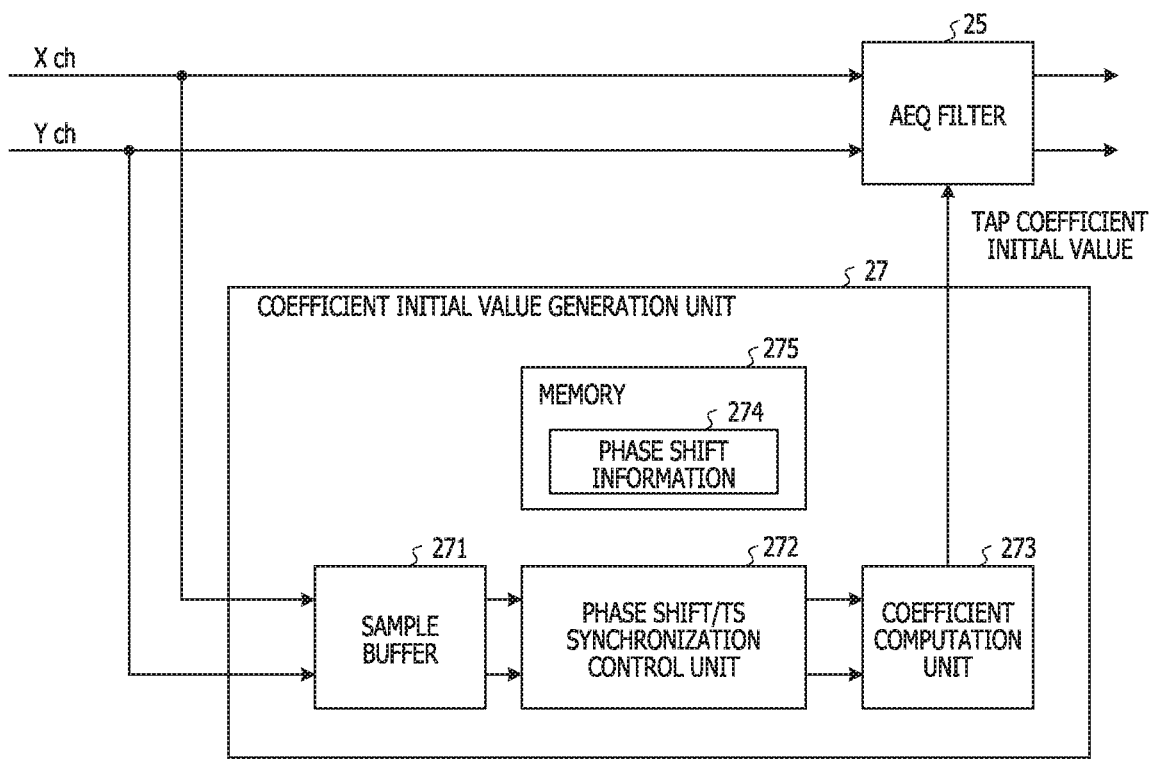
FIG. 5 is an overview diagram of an adaptive equalizer of the embodiment.

FIG. 5 is a schematic diagram of the adaptive equalizer 30. The X-channel signal and the Y-channel signal separated by the channel separator 21 are input to the AEQ filter 25 and subjected to the adaptive equalization processing during communication. When a system is started up, prior to data communication, the X-channel signal and the Y-channel signal are input to the coefficient initial value generation unit 27, and the coefficient initial value to be set in the tap of the AEQ filter 25 is determined.

The coefficient initial value generation unit 27 includes a sample buffer 271, a phase shift and TS synchronization control unit (hereinafter referred to as "phase shift/TS synchronization control unit") 272, a coefficient computation unit 273, and a memory 275 holding phase shift information 274. The sample buffer 271 sequentially accumulates fractionally sampled sample data of each channel.

The phase shift/TS synchronization control unit 272 reads sample data containing a number of samples that are allowed to be subjected to TS synchronization processing, from a certain position in the sample buffer 271. The reading position at this time sometimes does not coincide with the start position of the training sequence. Therefore, the buffer selection area is changed while being moved by one sample at a time, and a reading position when the correlation between two consecutive patterns becomes the highest is specified as the start position of the training sequence.

The number of samples that are allowed to be subjected to the TS synchronization processing denotes the number of samples for which the correlation between pattern pairs included in the training sequence is allowed to be calculated and the start position of the training sequence is allowed to be specified. When the number of pattern pairs included in the training sequence is assumed as m, the symbol length of each pattern is assumed as T, and the sampling rate is assumed as f, it is desirable to read (m×2×f×T) pieces of sample data from the sample buffer 271.

The phase shift/TS synchronization control unit 272 calculates, for every (f×T) pieces of read sample data, a correlation value with respect to next (f×T) pieces of sample data subsequent to the read sample data. At this time, the above-described phase shift processing is performed if applicable. For example, when the value of f×T is not an integer, by referring to the phase shift information 274, the sample value of either one of the first (f×T) pieces of data and the next (f×T) pieces of data is replaced with the sample value at a sample point phase-shifted from the sample position of the either one by a predetermined amount.

Even when the value of f×T is not given as an integer, the replacement processing by phase shift allows to calculate the correlation between the former (f×T) pieces of data and the subsequent (f×T) pieces of data.

FIG. 6 illustrates, as an example of the phase shift information 274, phase shift information 274a when the symbol length T of each pattern included in the training sequence TS is 4 (T=4). When the sampling rate f is 3/2, which means when the fractional sampling at 1.5 times is performed, no discrepancy in the positions of the sample points and the number of samples occurs between two consecutive patterns. This is because the value of f×T is 12/2=6, which is an integer value. In this case, since the phase shift is not expected for the sample points, the amount of phase shift is zero.

When the sampling rate f is 4/3, the fractional sampling at 1.33 . . . times is performed. The value of f×T is 16/3, which is not an integer value. As in FIG. 3, when the preceding sample point is phase-shifted to a later sample point in time, the amount of phase shift is +0.25 symbols. When the following sample is phase-shifted to a sample point traced back in time, the amount of phase shift is given as −0.50 symbols.

When the sampling rate f is 5/4, the fractional sampling at 1.25 times is performed. The value of f×T is given as an integer because of 20/4=5. Since no discrepancy in the positions of the sample points and the number of samples occurs between two consecutive patterns, the amount of phase shift is given as zero.

Figure 7:
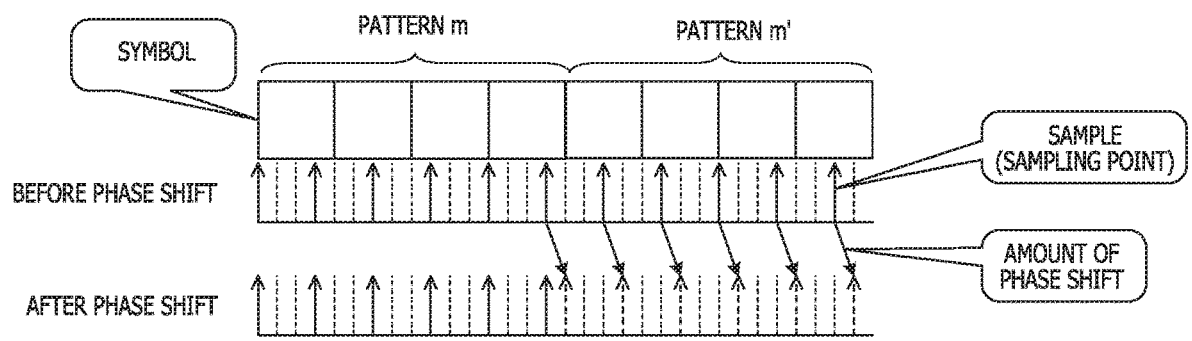
FIG. 7 is a diagram explaining the basis of the amount of phase shift in FIG. 6.
Figure 8:
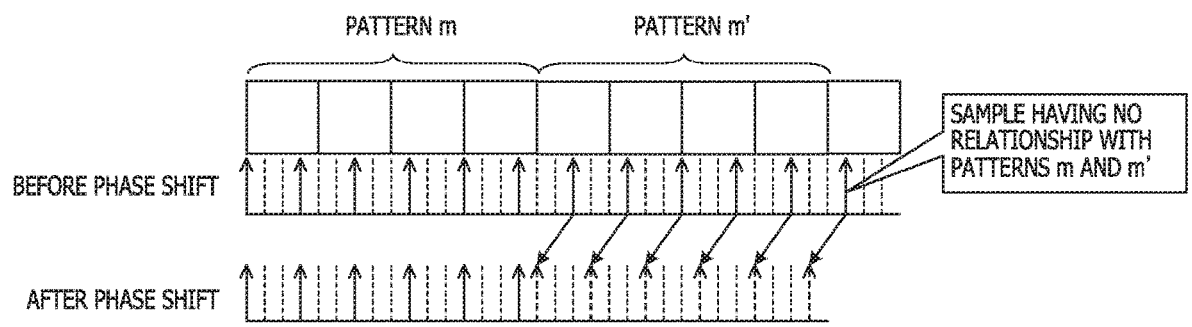
FIG. 8 is a diagram explaining the basis of the amount of phase shift in FIG. 6.
Figure 9:
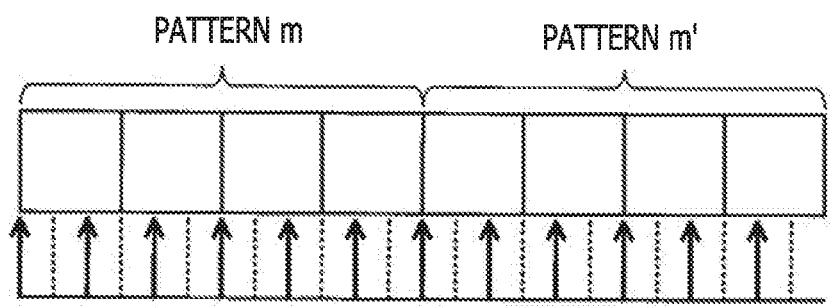
FIG. 9 is a diagram explaining the basis of the amount of phase shift in FIG. 6.
Figure 9:
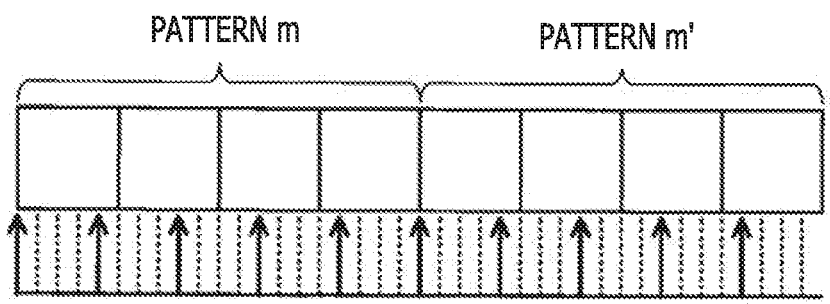

FIGS. 7 to 9 are diagrams explaining the basis of the amount of phase shift of the phase shift information 274a. FIG. 7 illustrates the amount of phase shift when the preceding sample is phase-shifted to a later sample point in time when the sampling rate f is 4/3. FIG. 8 illustrates the amount of phase shift when the following sample is phase-shifted to a sample point traced back in time under the same conditions.

In FIG. 7, the symbol length T of each of the consecutive patterns m and m' is 4 symbols. Since the sampling rate f is 4/3, sampling is performed at every third fraction of each symbol divided into four. This fractional sampling causes a discrepancy in the positions and the number of sample points between the patterns m and m'.

In order to match the patterns of sampling between the patterns m and m', for example, the sample value at a position obtained by phase-shifting each sample point by +1/4 symbols (which is +0.25 symbols) is used as the sample value of the pattern m'. The first sample point of the pattern m' after the phase shift is substituted with a sample value when the last sample point of the pattern m is phase-shifted.

As in FIG. 8, the following sample may be phase-shifted in a direction to trace back in time (minus direction). The sample value at each sample point of the pattern m' is replaced with a sample value when the phase shift by −2/4 symbols (which is −0.50 symbols) is performed. The last sample value of the pattern m' is substituted with the sample value at a position obtained by tracing back the sample point of the next symbol by 2/4 symbols. The next symbol may be, for example, a cyclic prefix inserted between pattern pairs.

FIG. 9 illustrates an example in which the value of f×T is given as an integer. When the fractional sampling is performed with the symbol length T=4 at the sampling rate f=3/2, each symbol is divided into three equal parts to obtain a total of 12 fractions. Sampling is performed at every second fraction, and the positions and the number of sample points become equal between the patterns m and m'. No phase shift is expected.

When the fractional sampling is performed with the symbol length T=4 at the sampling rate f=5/4, each symbol is divided into five equal parts to obtain a total of 20 fractions. Sampling is performed at every fourth fraction, and the positions and the number of sample points become equal between the patterns m and m'. No phase shift is expected.

FIG. 10 illustrates, as another example of the phase shift information 274, phase shift information 274b when the symbol length T of each pattern included in the training sequence is 5 (T=5). When the sampling rate f is 3/2, the value of f×T is 15/2, which is not an integer. The amount of phase shift when the preceding sample is phase-shifted to a later sample point in time is +1/2 symbols. The amount of phase shift when the following sample is phase-shifted to a sample point traced back in time is −1/2 symbols.

When the sampling rate f is 4/3, the value of f×T is 20/3, which is not an integer value. When the preceding sample is phase-shifted to a later sample point in time, the amount of phase shift is +0.50 symbols. The amount of phase shift when the following sample is phase-shifted to a sample point traced back in time is −0.25 symbols.

When the sampling rate f is 5/4, the value of f×T is 25/4, which is not an integer value. When the preceding sample is phase-shifted to a later sample point in time, the amount of phase shift is +0.2 symbols. The amount of phase shift when the following sample is phase-shifted to a sample point traced back in time is −0.6 symbols.

The calculation of the correlation between the pattern pair is enabled by replacing the value of the sample point of one of the pattern pair with the sample value at a position phase-shifted in either the plus direction or the minus direction.

FIGS. 11 to 16 are diagrams explaining the basis of the amount of phase shift of the phase shift information 274b in FIG. 10.

Figure 11:
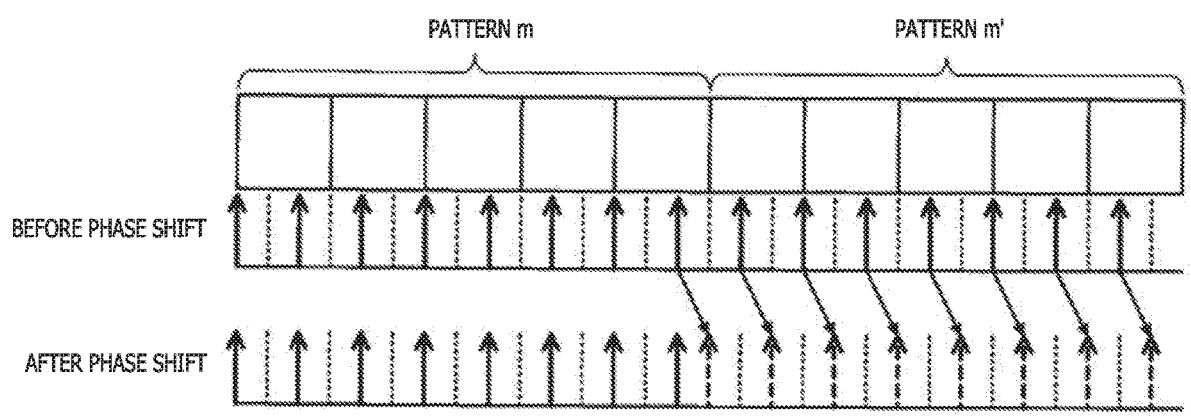
FIG. 11 is a diagram explaining the basis of the amount of phase shift in FIG. 10.
Figure 12:
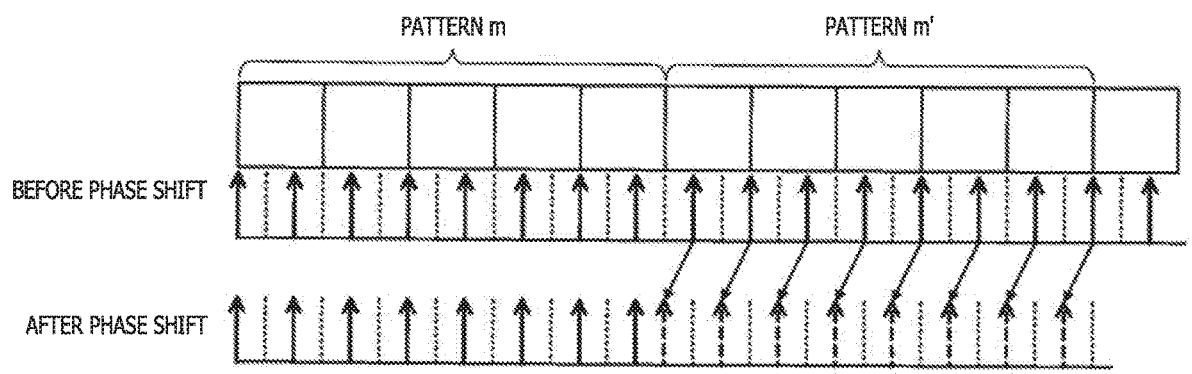
FIG. 12 is a diagram explaining the basis of the amount of phase shift in FIG. 10.

In FIGS. 11 and 12, since the symbol length T of each pattern is 5 and the sampling rate f is 3/2, sampling is performed at every second fraction of each symbol divided into three. This fractional sampling causes a discrepancy in the positions and the number of sample points between the patterns m and m'.

In FIG. 11, each sample of the pattern m' is replaced with the sample value at a sample point phase-shifted by +1/2 symbols.

In FIG. 12, the following sample is phase-shifted to a sample point traced back in time. Each sample value of the pattern m' is replaced with the sample value at a sample point phase-shifted by −1/2 symbols.

Figure 13:
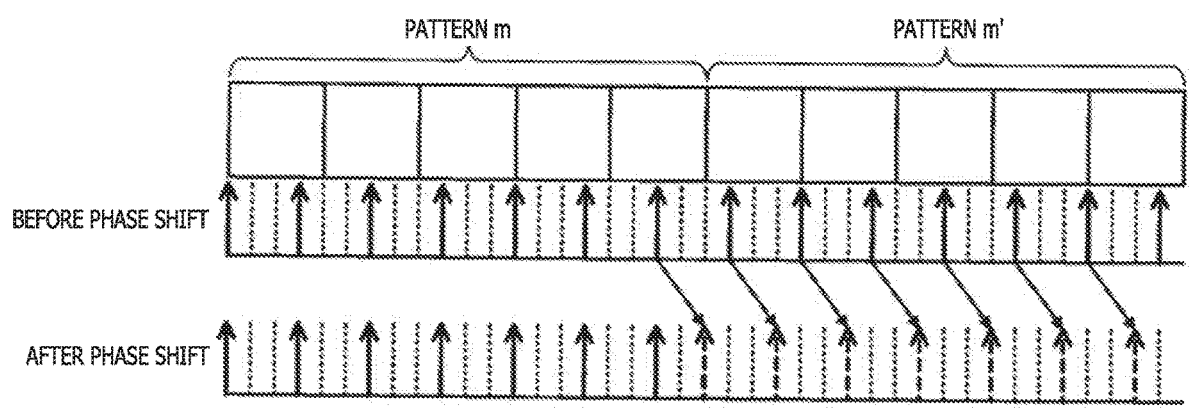
FIG. 13 is a diagram explaining the basis of the amount of phase shift in FIG. 10.
Figure 14:
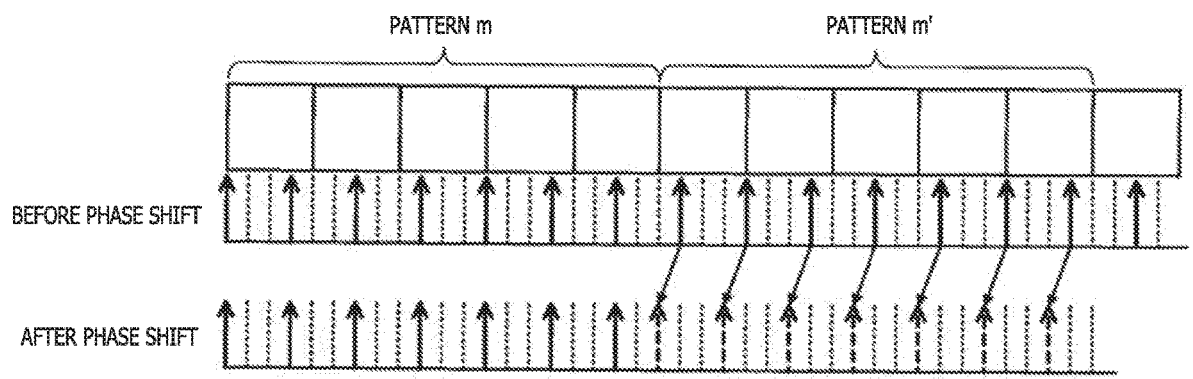
FIG. 14 is a diagram explaining the basis of the amount of phase shift in FIG. 10.

In FIGS. 13 and 14, since the sampling rate f is 4/3, sampling is performed at every third fraction of each symbol divided into four. This fractional sampling causes a discrepancy in the positions and the number of sample points between the patterns m and m'.

In FIG. 13, each sample of the pattern m' is replaced with the sample value at a position phase-shifted by +2/4 symbols, which is +0.5 symbols.

In FIG. 14, the following sample is phase-shifted to a sample point traced back in time. Each sample value of the pattern m' is replaced with the sample value at a sample point phase-shifted by −1/4 symbols, which is −0.25 symbols.

Figure 15:
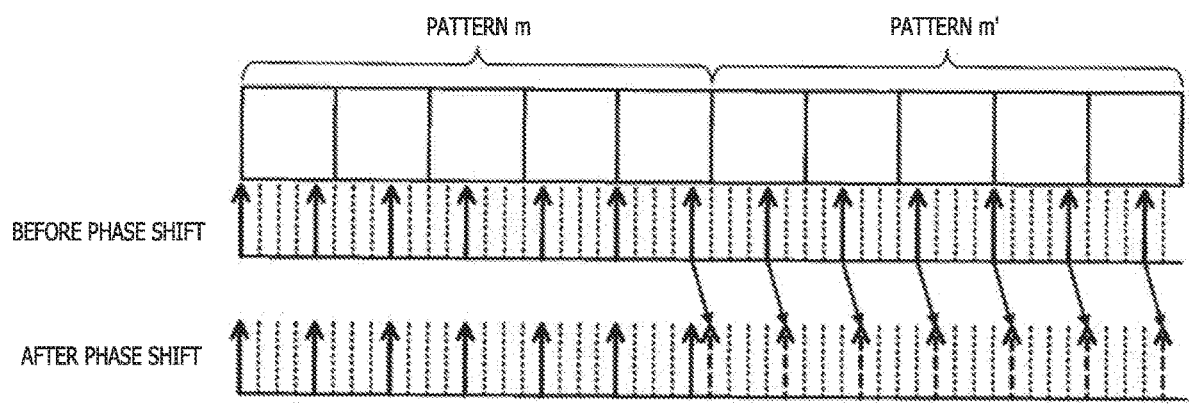
FIG. 15 is a diagram explaining the basis of the amount of phase shift in FIG. 10.
Figure 16:
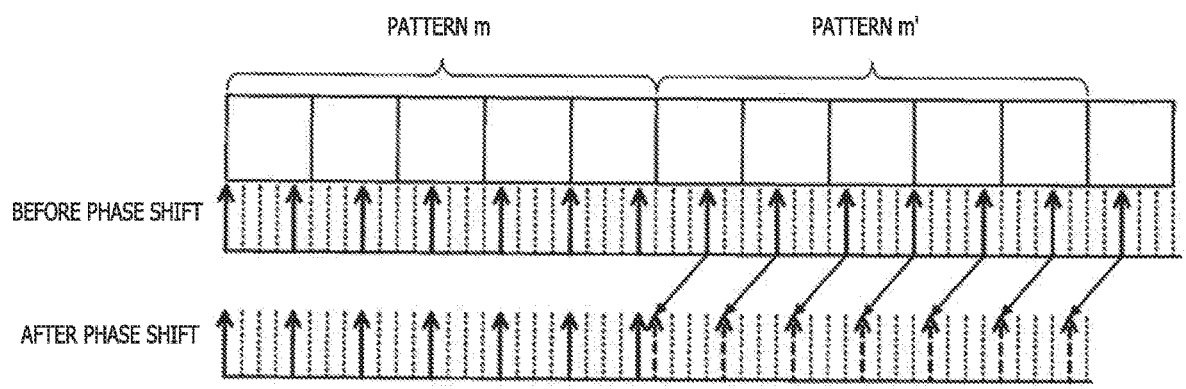
FIG. 16 is a diagram explaining the basis of the amount of phase shift in FIG. 10.

In FIGS. 15 and 16, since the sampling rate f is 5/4, sampling is performed at every fourth fraction of each symbol divided into five. This fractional sampling causes a discrepancy in the positions and the number of sample points between the patterns m and m'.

In FIG. 15, each sample of the pattern m' is replaced with the sample value at a position phase-shifted by +1/5 symbols, which is +0.2 symbols.

In FIG. 16, the following sample is phase-shifted to a sample point traced back in time. Each sample value of the pattern m' is replaced with the sample value at a sample point phase-shifted by −3/5 symbols, which is −0.6 symbols.

The calculation of the correlation between the pattern pair is enabled by replacing the value of the sample point of one of the two consecutive patterns with the sample value at a phase-shifted position in either the plus direction or the minus direction.

Figure 17:
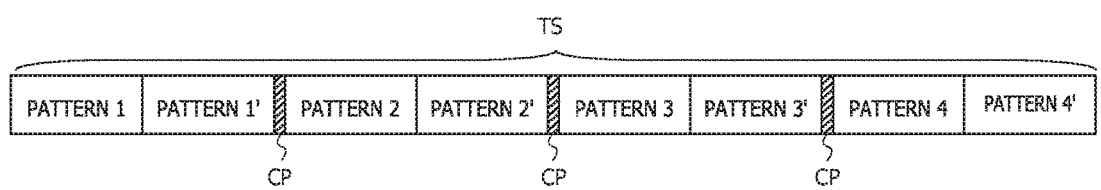
FIG. 17 is a diagram explaining the calculation of a correlation value for specifying the position of a training sequence.
Figure 17:
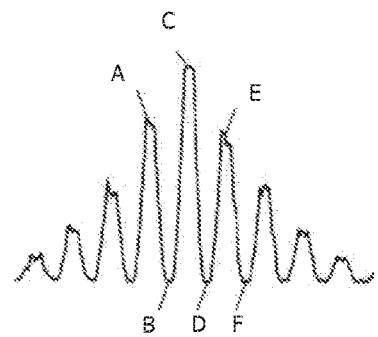

FIG. 17 is a diagram for explaining the calculation of the correlation value for the TS synchronization. The phase shift/TS synchronization control unit 272 performs the TS synchronization processing after the phase shift processing is performed, and specifies the start position of the training sequence TS in the sample buffer 271.

Precisely speaking, not only each pattern pair included in the training sequence TS, but also the cyclic prefix CP that delimits the pattern pairs is digitally sampled, but description will be given of a state in which the cyclic prefix CP is removed, for simplicity of explanation.

In data read from any position of the sample buffer 271, the phase shift/TS synchronization control unit 272 calculates, for each sample set containing (f×T) pieces, the autocorrelation value with respect to the next sample set containing (f×T) pieces. As a premise of this processing, when the value of f×T is not an integer, the phase shift processing is performed on either one of the sample sets.

As an example, 4×(2×f×T) consecutive pieces of sample data are read from the sample buffer 271 as sample data corresponding to four pattern pairs.

The autocorrelation value in each sample set is calculated by expression (1).

[Expression 1]

$$\sum_{n=0}^{fT-1} S(n)\overline{S}(n+fT) \quad (1)$$

$\overline{S}$: Complex Conjugate

Here, S with a bar denotes the complex conjugate of a sample S. The reference sign n denotes the n-th piece of data in the sample set containing (f×T) pieces, and is an integer from 0 to (fT−1).

For each sample set containing (f×T) pieces, the autocorrelation value with respect to the next continuous sample set containing (f×T) pieces is calculated, and the total sum of the obtained autocorrelation values is worked out, based on expression (1). For the total sum, the autocorrelation values may be summed up after being calculated for all the sample sets, or the autocorrelation value calculated for each sample set may be sequentially added.

When (f×T) pieces of sample data are selected at the delimiter of the pattern pair, the autocorrelation value of this sample set is maximized. Moreover, when the buffer selection position matches the head position of the training sequence TS, the total sum of the autocorrelation values is maximized.

In the example A of the correlation computation result, the selection start position for the sample buffer 271 is located in front of the buffer position of the training sequence TS, and the autocorrelation values of three pattern pairs are calculated.

In the example B, the buffer selection position is closer to the start position of the training sequence TS than in the example A, but the autocorrelation computation is performed between different patterns.

In the example C, the autocorrelation between the paired patterns is obtained for all the four sample sets.

In the examples D, E, and F, the buffer selection position begins in the middle of the training sequence TS, and a smaller number of autocorrelation results is obtained. In the examples D and F, the autocorrelation between different patterns is calculated.

In the correlation computation result worked out by the total sum of the autocorrelation values, the maximum peak is obtained in the example C, and the buffer selection start position at this time is verified to be the start position of the training sequence. In the examples A and E, the autocorrelation between the paired patterns is obtained, but the peak of the total sum is smaller than that in the example C because the number of autocorrelation values is smaller. In the examples B, D, and F, since the autocorrelation values between different patterns are calculated, the total sum is minimized.

In the autocorrelation computation using expression (1), even when the fractional sampling is performed and f×T is not given as an integer, the phase shift processing is performed on one of the two consecutive sample sets, and thus the autocorrelation value may be calculated properly.

Figure 18:
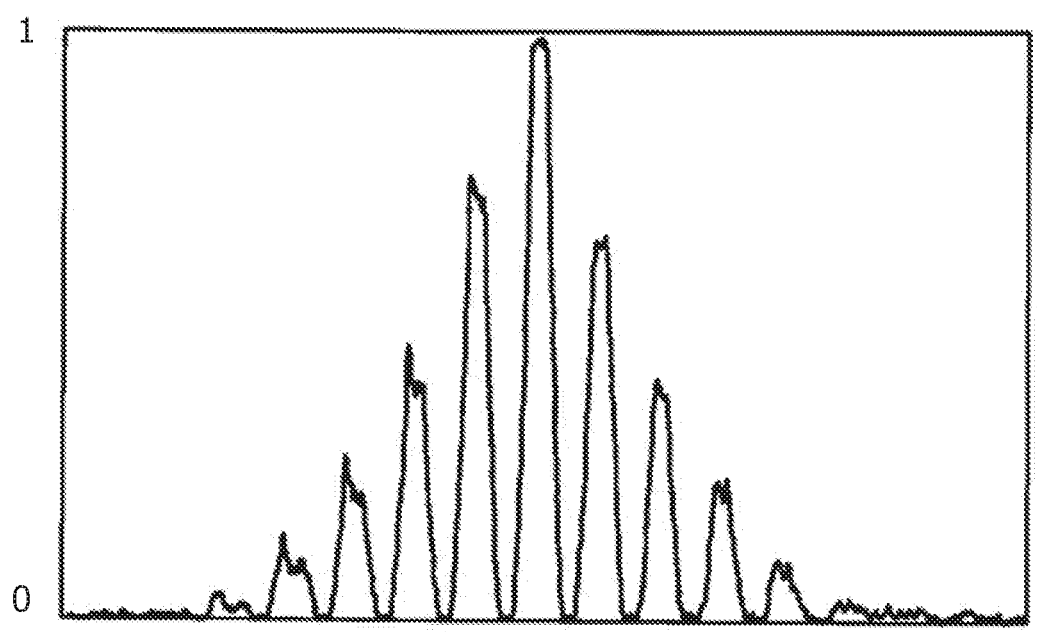
FIG. 18 is a diagram illustrating an autocorrelation result when f=2 is employed.
Figure 19:
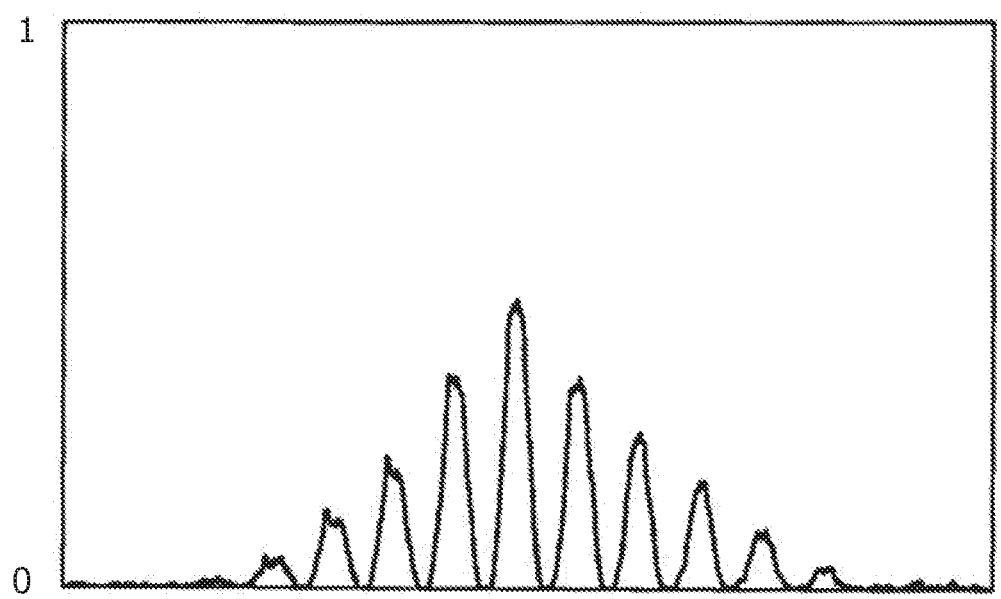
FIG. 19 is a diagram illustrating an autocorrelation result when f=4/3 is employed.

FIG. 18 illustrates the correlation result (total sum) when the sampling rate f=2 is employed. FIG. 19 illustrates the correlation result (total sum) when the sampling rate f=4/3 is employed. In FIGS. 18 and 19, the total sum of correlation values on the vertical axis is normalized using the peak value at f=2 as 1. When the sampling rate f is 2, the total sum of autocorrelation values is large as a whole because a large number of samples are input to the DSP 20.

As in FIG. 19, when the sampling rate f takes a value higher than once the symbol rate and lower than twice the symbol rate (1<f<2), the number of samples decreases and the peak value of the correlation result accordingly becomes smaller as a whole. However, the tendency of the correlation result is the same as in FIG. 18. Since it suffices to discriminate the position of the maximum peak from the correlation result, the method in FIG. 19, which is low in the amount of computation and power consumption, is advantageous.

Figure 20:
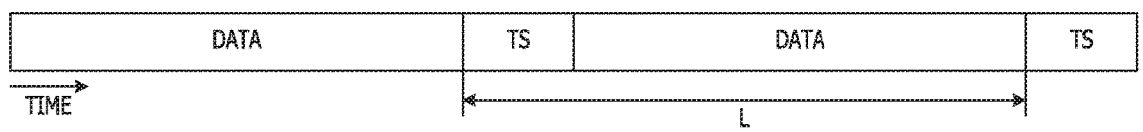
FIG. 20 is a diagram explaining the setting of the initial value of a tap coefficient.
Figure 20:
Figure 20:
Figure 20:
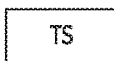

FIG. 20 is a diagram explaining the determination of the initial value of the tap coefficient using the training sequence. On the transmission side, the already known training sequence TS is inserted between two pieces of data in advance. The training sequences TS to be inserted are all the same and each training sequence includes m pattern pairs. A joint length L of the data and the training sequence TS is fixed.

On the reception side, the optical signals are received in order from the optical signal transmitted earlier in time. The optical signal including the data and the training sequence TS is converted into an analog electrical signal, and the analog electrical signal is digitally sampled. The position of the training sequence TS in the data is specified by the phase shift and the TS synchronization described above. The training sequence TS specified on the reception side is affected by the transmission line. The coefficient computation unit 273 of the coefficient initial value generation unit 27 estimates the characteristics of the transmission line based on the training sequence TS on the reception side and the already known training sequence inserted on the transmission side, and sets the initial value of the tap coefficient of the AEQ filter. For example, channel estimation is performed by a minimum mean square error (MMSE) method or the like that minimizes the squared error, and the coefficient initial value representing the inverse characteristics of the transfer function for the transmission line is found.

Figure 21:
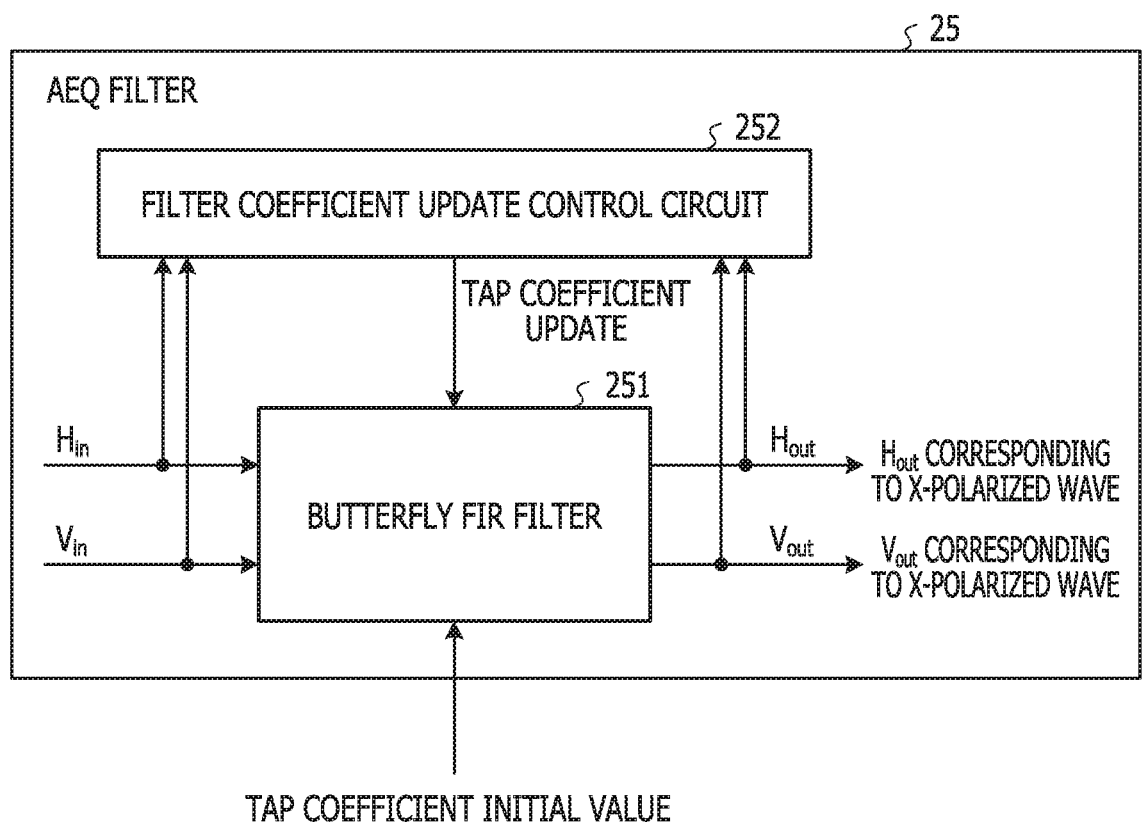
FIG. 21 is a diagram illustrating an exemplary configuration of an adaptive equalization (AEQ) filter of the adaptive equalizer.

FIG. 21 is a schematic diagram of the AEQ filter 25 of the adaptive equalizer 30. The AEQ filter 25 includes, for example, a butterfly FIR filter 251 and a filter coefficient update control circuit 252. Components $H_{in}$ and $V_{in}$ obtained by separation into polarized waves are input to the adaptive equalizer 30 through the X channel and the Y channel, for example. The X-polarized wave and the Y-polarized wave are contained in $H_{in}$ and $V_{in}$, which are imparted with the transmission line characteristics.

In the butterfly FIR filter 251, the inputs and outputs of the four FIR filters corresponding to elements $P_{xx}$, $P_{xy}$, $P_{yx}$, and $P_{yy}$ of a matrix describing the polarization characteristics of the transmission line are connected crosswise.

Prior to the start of communication, the tap coefficient initial value determined by the coefficient initial value generation unit 27 is set to the tap of each FIR filter of the butterfly FIR filter 251.

During communication, the filter coefficient update control circuit 252 updates each of the tap coefficient for the X-polarized wave and the tap coefficient for the Y-polarized wave in accordance with polarization fluctuations of the transmission line. The tap coefficient is updated such that the error between the input signal and the desired signal is minimized, for example.

$H_{out}$ and $V_{out}$ output from the butterfly FIR filter 251 correspond to the X-polarized wave and the Y-polarized wave, respectively, in which the influence of the transmission line characteristics is compensated.

The output of the adaptive equalizer 30 is subjected to error correction and decoding processing in the decoder 29, and output from the DSP 20. The bit string output from the DSP is converted into a signal of, for example, a predetermined local area network (LAN) standard in the next stage.

Figure 22:
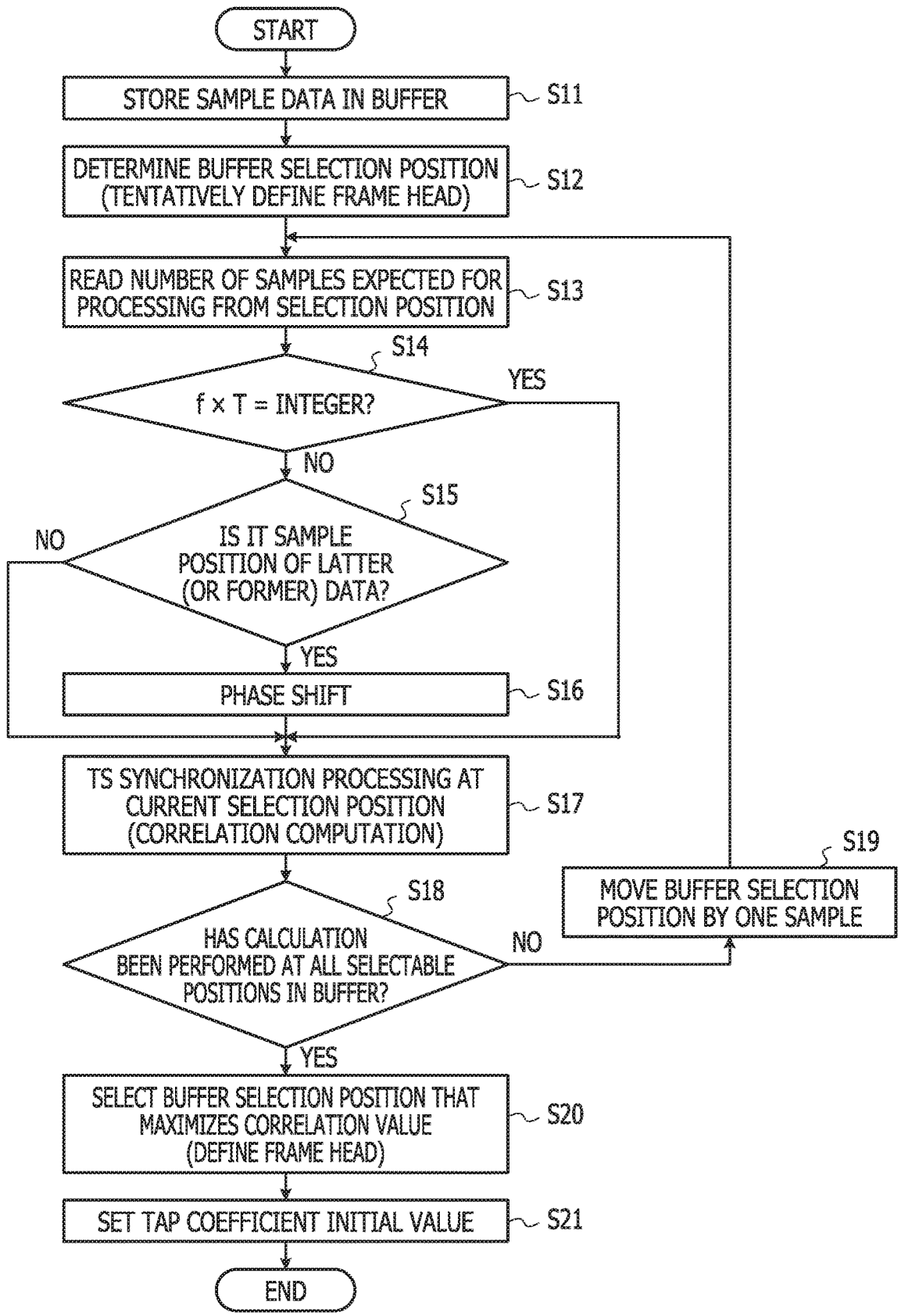
FIG. 22 is a flowchart of an adaptive equalization method of an embodiment.

FIG. 22 is a flowchart of an adaptive equalization method of the embodiment. This flow indicates processing of setting the tap coefficient initial value of the adaptive equalizer, and is executed by the adaptive equalizer 30 of the DSP 20.

When a system or the optical receiver 10 is activated, the adaptive equalizer 30 sequentially stores input sample data in the sample buffer 271 (S11). The sample data is data that has been fractionally sampled by the ADC 17.

The phase shift/TS synchronization control unit 272 of the adaptive equalizer determines the selection position for the sample buffer 271 (S12). The selection of the buffer position at this time tentatively defines the position of the frame head for performing the TS synchronization processing that specifies the training sequence TS.

A number of pieces of sample data expected for the TS synchronization processing is read from the selected buffer position (S13).

Assuming that the sampling rate of the fractional sampling is f and the symbol length of each pattern of the pattern pair included in the training sequence TS is T, it is verified whether or not f×T is an integer (S14). When f×T is an integer (YES in S14), the processing jumps to S17 to perform the TS synchronization processing at the current buffer selection position (S16). As described above, the TS synchronization processing is processing of calculating the autocorrelation value between the (f×T) pieces of sample data and the next (f×T) pieces of sample data subsequent to the first (f×T) pieces of sample data at the selected buffer position, and working out the total sum of autocorrelation values of respective pairs of data.

When f×T is not an integer (NO in S14), it is verified whether or not (f×T) pieces of sample data of interest are located at a sample position of the following sample set (or the preceding sample set) targeted for the phase shift processing, among two consecutive sample sets (S15).

When the sample position of the latter (or the former) sample data targeted for the phase shift processing is applicable (YES in S15), the phase shift information 274 is referred to and the phase shift processing is performed (S16). For example, the read sample value is replaced with the sample value at a sample point phase-shifted from the sample point of the read sample value by a predetermined amount. Thereafter, the TS synchronization processing is performed at the current selection position (S17). When the sample set of interest is not targeted for the phase shift processing (NO in S15), the processing jumps to S17 to perform the TS synchronization processing at the current selection position.

Once the TS synchronization processing is performed, which means that the total sum of autocorrelation values is found, it is verified whether or not the correlation computation has been performed at all selectable positions in the sample buffer 271 (S18). When the correlation computation at another position remains (NO in S18), the buffer selection position is moved by one sample (S19), and steps S13 to S18 are repeated. In the second and subsequent loops, S14 may be skipped.

Once the correlation computation is completed at all selectable positions in the sample buffer 271 (YES in S18), a buffer selection position that maximizes the correlation value (the total sum of autocorrelation values) is defined as the frame head position (S20).

When the frame head position of the training sequence TS is defined, the position of the entire training sequence TS is resolved because the length of the training sequence TS is already known. Based on the sample values of the discriminated training sequence TS and the already known training sequence that has been transmitted, the initial value of the tap coefficient of the AEQ filter 25 of the adaptive equalizer 30 (for example, the tap coefficient of each filter of the butterfly FIR filter) is calculated, and the coefficient initial value is set in the tap (S21).

By this method, even when the fractional sampling is performed, the insertion position of the training sequence TS may be properly specified based on the correlation computation, and an appropriate tap coefficient initial value may be set in the adaptive equalizer 30. As a result, the circuit scale and power consumption of the adaptive equalizer 30 may be lowered.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An adaptive equalizer, comprising:
a sample buffer; and
a processor coupled to the sample buffer and configured to:
perform an adaptive equalization on data which has been fractionally sampled at a sampling rate higher than once a symbol rate and lower than twice the symbol rate,
determine an initial value of a tap coefficient of the adaptive equalizer by using a training sequence inserted in the data,
shift, by a predetermined shift amount, a sample point of one pattern from among two consecutive patterns included in the training sequence,
specify a position of the training sequence in the data by replacing an original sample value with a sample value at the shifted sample point, and update the initial value of the tap coefficient based on the specified training sequence.

2. The adaptive equalizer according to claim 1, wherein the predetermined shift amount is uniquely defined by the sampling rate and a symbol length of the one pattern.

3. The adaptive equalizer according to claim 2, wherein the predetermined shift amount is zero when a product of the sampling rate and the symbol length is an integer.

4. The adaptive equalizer according to claim 1, wherein the sample buffer that sequentially stores the data that has been fractionally sampled; and
the processor is configured to:
   read sample data in a predetermined range while a selection position for the buffer is moved by one sample at a time, and
   determine, as a start position of the training sequence, a buffer selection position that maximizes a correlation value between the two consecutive patterns.

5. The adaptive equalizer according to claim 1, wherein the sample buffer that sequentially stores the data that has been fractionally sampled; and
the processor is configured to:
   when the sampling rate is f and the symbol length of the one pattern is T, calculate a correlation value between a first sample set that contains (f×T) pieces and a second sample set that contains (f×T) pieces and is subsequent to the first sample set, and
   determine a buffer selection position when the correlation value is maximized, as a start position of the training sequence, based on a sample value after the phase shift.

6. The adaptive equalizer according to claim 1, wherein the training sequence includes m (m is a natural number) pattern pairs, each pattern pair has two same code patterns, and different pattern pairs have different code patterns.

7. An optical receiver comprising:
an optoelectric conversion circuit that converts an optical signal received through a transmission line into an analog electrical signal;
an analog-to-digital converter that fractionally samples the analog electrical signal at the sampling rate; and
the adaptive equalizer according to claim 1, wherein the adaptive equalizer carrying out adaptive equalization on the data that has been fractionally sampled.

8. An adaptive equalization method executed by an adaptive equalizer comprising:
performing an adaptive equalization on data which has been fractionally sampled at a sampling rate higher than once a symbol rate and lower than twice the symbol rate;
determining an initial value of a tap coefficient of the adaptive equalizer by using a training sequence inserted in the data;
shifting, by a predetermined shift amount, a sample point of one pattern from among two consecutive patterns included in the training sequence;
specifying a position of the training sequence in the data by replacing an original sample value with a sample value at the shifted sample point; and
updating the initial value of the tap coefficient based on the specified training sequence.

* * * * *